2,749,373

ISOMERIZATION OF HEXACHLOROCYCLOHEXANE

Robert H. Meyer, Concord, Calif., assignor to The Dow Chemical Company, Midland, Mich., a corporation of Delaware No Drawing. Application May 25, 1953, Serial No. 357,343

5 Claims. (Cl. 260—648)

This invention relates to a method for converting one isomeric form of 1,2,3,4,5,6-hexachlorocyclohexane to one or more other isomers of the same compound.

It is known that hexachlorocyclohexane (also known as benzene hexachloride) is capable of existence in several isomeric forms, of which seven have been isolated and are readily identified. The known isomers are designated by the Greek letters alpha, beta, gamma, delta, epsilon, eta and theta. Of these principal isomers, only two have commercial importance at present. These are the gamma-isomer, which is an active insecticide, and the delta-isomer, which is useful in suppressing the growth of aquatic weeds. All of the isomers are produced simultaneously by the usual processes of making benzene hexachloride. The predominant isomer in the crude mixture is always the alpha-isomer. The amounts of the gamma- and delta-isomers obtained initially are dependent on the reaction conditions, but the gamma-isomer does not greatly exceed 25 percent of the mixture under the best conditions, and usually is considerably under 20 per cent, while the delta-isomer content is ordinarily below 5 percent of the crude mixture.

It would be desirable to be able to convert one isomer of benzene hexachloride to one or a mixture of the other isomers. It would be especially desirable to be able to convert the alpha- and the beta-isomers, for which no commercial use is now known, to the more useful isomers. If this cannot be done directly, it would be desirable to be able to convert one isomer to another which latter can be converted in turn to a more useful isomer. The foregoing and related desirable ends constitute the principal objects of the present invention.

According to the present invention, one isomer of benzene hexachloride may be converted into one or more other isomers of the same compound by heating it in a closed vessel with from 1 to 10 per cent of its weight of anhydrous aluminum chloride, at a temperature at which the benzene hexachloride is molten, from 130° to 200° C., and preferably from 140° to 170° C. Especially when operating at temperatures from 170° to 200° C., it is desirable to carry out the reaction at superatmospheric pressure in an atmosphere of hydrogen chloride, to suppress any tendency toward dehydrochlorination. The reaction mass need not be held at reaction temperature for more than an hour to observe the isomerization, even at the lower end of the temperature range, and temperatures near or above 200° C. must not be maintained over an hour if the dehydrochlorination of benzene hexachloride to trichlorobenzenes is to be avoided. The latter reaction, undesirable here, is known to occur when benzene hexachloride is heated with aluminum chloride at atmospheric pressure, and is described by Alquist et al. in U. S. Patent No. 2,569,441. It is apparently essential to the commercial success of the dehydrochlorination process that the hydrogen chloride be allowed to escape as formed, while the present process requires a sealed vessel from which any hydrogen chloride which may be formed cannot escape during the isomerization reaction.

The following examples illustrate the practice of the invention:

Example 1

To 12.4 grams of alpha-benzene hexachloride was added 0.248 gram of anhydrous aluminum chloride. The mixture was contained in a glass tube, which was sealed in a Monel metal pressure vessel. Hydrogen chloride was admitted under 670 pounds pressure per square inch. The pressure vessel was heated to 170° C. for one hour. The contents of the glass tube was then analyzed and found to consist chiefly of 78 per cent unchanged alpha-isomer and 13 per cent delta-isomer. No trichlorobenzenes were formed.

Example 2

A mixture of 28.5 grams of gamma-isomer of benzene hexachloride and 0.57 gram of anhydrous aluminum chloride was heated in the same apparatus under a superposed hydrogen chloride pressure of 315 pounds per square inch at 140° to 167° C. for 30 minutes. The product consisted chiefly of 45 per cent alpha-isomer and 42 per cent delta-isomer, the balance being unchanged gamma-isomer and epsilon-isomer. No trichlorobenzenes were formed.

Example 3

The gamma-isomer of benzene hexachloride was mixed with 5.6 per cent by weight of anhydrous aluminum chloride and heated in a sealed tube without superimposed hydrogen chloride pressure for 2.5 hours at 170° to 190° C. The reaction product contained 72 per cent alpha-isomer, 11.9 per cent delta-isomer and 12.3 per cent epsilon-isomer. No trichlorobenzenes were formed.

Other runs have been made at temperatures ranging from 120° C. (reaction too slow) to 210° C. (too much dehydrochlorination), both with and without applied hydrogen chloride pressure. Similar results to those reported above are obtained in the range from 130° to 200° C. In each case, isomerization was noted.

The alpha-isomer has, as its principal conversion product, the useful delta-isomer. Similarly, the beta-isomer forms the alpha-isomer, from which the delta isomer may be made; the gamma-isomer forms both alpha- and delta-isomers as principal products; and, the delta isomer, when subjected to the new reaction conditions gives some alpha-isomer and some gamma-isomer.

The invention has been illustrated and is principally concerned with isomerization of benzene hexachloride. The more highly chlorinated members of the series, including heptachlorocyclohexane (monochlorobenzene hexachloride) and the octachlorocyclohexanes (dichlorobenzene hexachlorides) exist in a similar plurality of isomeric forms and are subject to isomerization by the same treatment.

I claim:

1. The method which comprises heating benzene hexachloride with from 1 to 10 per cent of its weight of anhydrous aluminum chloride at a temperature in the range from 130° to 200° C. in a sealed vessel for a period of time which does not exceed one hour, thereby to alter materially the isomer ratio in the benzene hexachloride without substantial conversion of benzene hexachloride to trichlorobenzenes.

2. The method claimed in claim 1, wherein the reaction is effected at a temperature from 140° to 170° C.

3. The method claimed in claim 1, wherein the reaction is effected under a superatmospheric pressure of added hydrogen chloride.

4. The method claimed in claim 1, wherein the benzene hexachloride subjected to the treatment is chiefly the alpha-isomer and the product contains an augmented proportion of delta-isomer.

5. The method claimed in claim 1, wherein the benzene hexachloride subjected to the treatment is chiefly the gamma-isomer and the product contains an augmented proportion of delta-isomer.

References Cited in the file of this patent
UNITED STATES PATENTS 2,569,441     Alquist et al. _____ Oct. 2, 1951

OTHER REFERENCES

Van der Linden: "Ber. der deut. Chem. Gesell.," vol. 45, pages 239–47 (1912).